(12) United States Patent
Paul et al.

(10) Patent No.: US 7,479,523 B2
(45) Date of Patent: Jan. 20, 2009

(54) METALLIC-COLORED THERMOPLASTIC MOLDING COMPOUND

(76) Inventors: Martin Paul, Aufder Heide 10A, Hamburg (DE) 22393; Christian Scheurell, Friedrich-Ebert-Str. 19a, Norderstedt (DE); Felix Rattay, Hoffman-von-Fallersleben-Str. 21, Hamburg (DE) 21039; Thomas Schuldt, Kampstr, 5D, Reinbek (DE) 21456; Andreas Teitge, Wetternstr. 21, Hamburg (DE) 21079

( * ) Notice: Subject to any disclaimer, the term of this patent is extended or adjusted under 35 U.S.C. 154(b) by 645 days.

(21) Appl. No.: 10/495,099

(22) PCT Filed: Nov. 8, 2001

(86) PCT No.: PCT/EP01/12906

§ 371 (c)(1),
(2), (4) Date: Jan. 21, 2005

(87) PCT Pub. No.: WO03/040225

PCT Pub. Date: May 15, 2003

(65) Prior Publication Data

US 2005/0119370 A1    Jun. 2, 2005

(51) Int. Cl.
*C08K 3/08* (2006.01)
(52) U.S. Cl. .......................... 524/599; 524/440; 524/606
(58) Field of Classification Search ....................... None
See application file for complete search history.

(56) References Cited

U.S. PATENT DOCUMENTS

| 5,459,189 A | 10/1995 | Hagimori et al. |
| 5,756,211 A * | 5/1998 | Ittmann et al. .............. 428/409 |

FOREIGN PATENT DOCUMENTS

| CA | 2243288 | * | 4/1999 |
| DE | 197 28 914 A1 | | 1/1999 |
| JP | 62164747 | | 7/1987 |

OTHER PUBLICATIONS

Database WPI, Section Ch, Week 198734; Derwent Publications Ltd., London, GB; AN 1987-240139; XP002204965.

* cited by examiner

*Primary Examiner*—Marc S Zimmer
(74) *Attorney, Agent, or Firm*—Lackenbach Siegel, LLP

(57) ABSTRACT

The invention relates to a metallic-colored thermoplastic molding material, which contains metal glitter in various admixtures. In addition, the invention relates to a method to manufacture this molding material and its use in molded bodies with openings. No visible formation of flow lines occurs with the use of this molding material, so that the quality of the goods manufactured is improved. For this purpose, it is planned that the percentage by weight of the metal glitter in the thermoplastic molding material lies between six and 15%, wherein the size of the glitter is not in a Gaussian distribution, but the molding material to a large extent contains only equally sized glitter particles in glitter mixtures.

12 Claims, No Drawings

METALLIC-COLORED THERMOPLASTIC MOLDING COMPOUND

DESCRIPTION

The invention relates to a metallic-colored thermoplastic molding material containing metal glitter in various admixtures.

In addition, the invention relates to a method for manufacturing this molding material and use of a molding material according to the invention to manufacture molded bodies.

Metallic-colored thermoplastic molding materials are used, for example, in situations where plastics have displaced metal components, but for reasons of design it is important that the optical appearance of the molded bodies be adapted to the metallic structure of the former metallic components.

In principle, this adaptation can be accomplished in two ways: First, by using an expensive and costly subsequent coloration coating of the molded parts or, second, by using a molding material that already has the desired color effect. The second approach is preferred for economic and ecological reasons.

Such a metallic-colored thermoplastic molding material, from which the invention departs as prior art, is known from DE 197 28 914 A1.

What is disadvantageous in the molding material described there is that it tends to form visible flow lines during processing using the injection molding method, particularly when complicated molded parts with openings are manufactured. These flow lines impair the uniform perception of color and produce qualitatively poor molded part surfaces. As a result, not just the quality but also the usability of the molded piece is diminished.

The objective of the invention is to disclose a molding material with whose use this undesirable formation of flow lines does not occur, in order to thereby improve the quality of the goods manufactured. In addition, an objective of the invention is to disclose a method with which molding materials can be manufactured in which the final product manufactured from it is free of flow lines. Finally, an objective of the invention is to disclose a molded body with openings whose flow lines are not visible.

This objective is attained by the present invention in that the percentage by weight of metal glitter in the metallic-colored thermoplastic molding material is greater than 5% and less than or equal to 15%. In an especially advantageous embodiment of the invention, the percentage by weight of metal glitter in the metallic-colored molding material is preferably greater than 6%, in particular the percentage lies between 6% and 13%. Surprisingly, molded bodies that are fabricated from this type of molding material with a considerably increased percentage of metal glitter have no visible flow lines. At the same time, the mechanical properties are advantageously retained.

In a preferred embodiment of the invention, the molding material contains hexagonal metal glitter. The metal-glitter admixture is advantageously any mixture of square, rectangular and hexagonal metal glitters. As a result, the shape of the metal glitter is better adapted to naturally occurring crystalline lattice structures.

These metal glitters are coated in another embodiment of the invention, in order to intensify bonding to the base material and improve mechanical properties.

The objective is also attained in that, in an especially favorable embodiment of the invention, the molding material of this type contains a metal-glitter admixture whose edge-length distribution is not a Gaussian distribution.

It is advantageous if this distribution is at least monomodal, preferably bimodal or multi-modal, whereby "modal" in the sense of the invention means that only metal glitter particles of almost the same size and shape are present.

Surprisingly, these types of admixtures produce a situation where the flow lines that are inevitably present no longer emerge optically in the final product and are therefore not visible.

In another embodiment of the invention, the base material for the thermoplastic molding material is composed of polyamide, which preferably contains reinforcing materials, in particular fibers and/or fillers. These types of base materials, which are advantageously mechanically, chemically and thermally resistant, also surprisingly do not form any visible flow structures even in the case of fiber reinforcement, although they otherwise tend to do so in the case of fibers.

The objective of manufacturing a metallic-colored thermoplastic molding material is attained according to the method by incorporating the metal glitter into the molding material, preferably by using a screw extruder at an admixing point that lies at a ratio of screw length to screw diameter of greater than 5 and less than 60, preferably between 20 and 50, in particular at 40. As a result, the specific energy input that occurs when compounding the molding material is so limited that the admixture of the metal glitter occurs non-destructively while maintaining the at least monomodal edge length distribution as well as maintaining a complete blending of base material and metal glitter, which allows the final product to appear free of flow lines.

Surprisingly, the use of a molding material according to the invention when manufacturing complicated molded bodies, in particular those with openings, leads to the formation of a uniform surface of the molded body. The formation of visible flow lines does not occur.

Finally, the objective is attained by a molded body that is composed of a molding material according to one of claims 1 through 10.

The invention will be explained, by way of example on the basis of the following example embodiment:

A polyamide, preferably the applicant's ALCOM™ 6 PA 900/8 GF 10 MR 20 silver metallic 12-778 FF, is used as the base material. The filler system is composed of a 30% hybrid system. This granulate is melted in a double-screw extruder in a known manner at the prescribed temperature, whereby kneading and mixing zones are also normally provided in the double-screw extruder.

The metal-glitter admixture is composed of various aluminum glitters, wherein the edge length of the glitter is between approximately 100 and 200 µm and its thickness lies between 16 and 54 µm. The metal glitter is added in the flow direction after the kneading and mixing zones. The addition takes place at an admixing point that lies at a ratio of screw length to screw diameter of 35. The temperature of the screw extruder in this process is between approx. 280 and 320° C., in order to guarantee complete and homogenous incorporation of the metal-glitter admixture.

The molding material obtained in this manner is then cooled in a quenching bath and formed into the shape to be used for subsequent use, for example, granulated.

This granulate is melted in an injection molding machine and injected through nozzles into a hollow mold that defines the final product. The molded body obtained after cooling features a uniform surface structure; flow lines do not emerge optically and are therefore not visible.

The invention claimed is:

1. A metallic-colored thermoplastic molding material comprising metal glitter in various admixtures, preferably in a square or rectangular shape, with an edge-length distribution of 0.05 to 1 mm, characterized in that the percentage by weight of metal glitter in the thermoplastic molding material is greater than 5% and less than or equal to 15% by weight characterized in that the edge-length distribution of the metal glitter is not a Gaussian distribution and characterized in that the edge length distribution is multi-modal.

2. A metallic-colored thermoplastic molding material according to claim 1, characterized in that the percentage by weight of metal glitter in the thermoplastic molding material is preferably greater than 6% by weight.

3. A metallic-colored thermoplastic molding material according to claim 1, characterized in that the percentage by weight of metal glitter in the thermoplastic molding material is between 6% and 13% by weight.

4. A metallic-colored thermoplastic molding material, according to claim 1, characterized in that the shape of the metal glitter contained in the molding material is hexagonal, and the admixture comprises a mixture of said shapes.

5. A metallic-colored thermoplastic molding material according to claim 1, characterized in that the metal glitter is coated.

6. A metallic-colored thermoplastic molding material according to claim 1, characterized in that the molding material comprises predominantly a polyamide as a base material.

7. A metallic-colored thermoplastic molding material according to claim 1, further comprising reinforcing materials comprising fibers and/or fillers.

8. A molded body comprising a metallic-colored thermoplastic molding material comprising metal glitter in various admixtures, preferably in a square or rectangular shape, with an edge-length distribution of 0.05 to 1 mm, characterized in that the percentage by weight of metal glitter in the thermoplastic molding material is between 6% and 15% by weight, whereby a molded article has no visible flow lines.

9. A metallic-colored thermoplastic molding material according to claim 8, characterized in that edge length distribution is at least monomodal.

10. A metallic-colored thermoplastic material according to claim 1, wherein the edge lengths distribution is one selected from bimodal and trimodal.

11. A metallic-colored thermoplastic molding material comprising metal glitter comprising a multi-modal edge-length distribution and the metal glitter comprises greater than 5% by weight of the thermoplastic molding material, whereby a molded article has no visible flow lines.

12. The thermoplastic molding material of claim 11, wherein the glitter is present in an amount of between 6% and 13%.

* * * * *